United States Patent
Banke et al.

(10) Patent No.: US 9,493,732 B2
(45) Date of Patent: Nov. 15, 2016

(54) METHOD FOR EXTRACTING AROMATIC SUBSTANCES FROM SOLID PLANT AROMATIC SUBSTANCE BEARERS IN A BREW LIQUID

(71) Applicants: Friedrich Banke, Inning am Holz (DE); Markus Langer, Altenstadt (DE)

(72) Inventors: Friedrich Banke, Inning am Holz (DE); Markus Langer, Altenstadt (DE)

(73) Assignee: BeVa Besitz-und Verwaltungs GmbH & Co. KG, Truchtlaching (DE)

( * ) Notice: Subject to any disclaimer, the term of this patent is extended or adjusted under 35 U.S.C. 154(b) by 125 days.

(21) Appl. No.: 14/076,417

(22) Filed: Nov. 11, 2013

(65) Prior Publication Data

US 2014/0186505 A1    Jul. 3, 2014

(30) Foreign Application Priority Data

Nov. 12, 2012    (DE) .......................... 10 2012 110 830

(51) Int. Cl.
| | |
|---|---|
| *C12C 11/11* | (2006.01) |
| *C12C 12/00* | (2006.01) |
| *A47J 31/00* | (2006.01) |
| *B01F 5/00* | (2006.01) |
| *B01F 5/02* | (2006.01) |
| *C12C 13/00* | (2006.01) |
| *C12C 3/08* | (2006.01) |

(52) U.S. Cl.
CPC ............... *C12C 12/00* (2013.01); *A47J 31/00* (2013.01); *B01F 5/0057* (2013.01); *B01F 5/0062* (2013.01); *B01F 5/0256* (2013.01); *C12C 3/08* (2013.01); *C12C 11/11* (2013.01); *C12C 13/00* (2013.01)

(58) Field of Classification Search
CPC .. B01F 5/0057; B01F 5/0062; B01F 5/0256; A47J 31/00; C12C 11/11; C12C 12/00; C12C 13/00; C12C 3/08
See application file for complete search history.

(56) References Cited

U.S. PATENT DOCUMENTS

| | | | | |
|---|---|---|---|---|
| 2,005,770 A | | 6/1935 | Bleser | |
| 3,379,117 A | * | 4/1968 | Richeson | A47J 31/40 99/283 |
| 4,305,328 A | * | 12/1981 | Kueser | A47J 31/32 99/283 |
| 4,778,584 A | * | 10/1988 | Inoue | B01D 35/06 204/272 |
| 4,820,420 A | * | 4/1989 | Hums | C12H 1/061 210/502.1 |
| 4,984,511 A | * | 1/1991 | Sekiguchi | A47J 31/401 99/287 |
| 5,115,730 A | * | 5/1992 | Gockelmann | A47J 31/0573 99/280 |
| 5,230,278 A | * | 7/1993 | Bunn | A47J 31/002 99/289 R |
| 2004/0055470 A1 | * | 3/2004 | Strauser | E01H 1/0827 96/417 |
| 2010/0096310 A1 | * | 4/2010 | Yoshida | B01D 29/23 210/151 |

FOREIGN PATENT DOCUMENTS

| | | |
|---|---|---|
| DE | 281 438 A | 10/1912 |
| DE | 19 34 709 A | 2/1971 |
| EP | 2 500 408 A1 | 9/2012 |

* cited by examiner

*Primary Examiner* — Anthony Weier
(74) *Attorney, Agent, or Firm* — Von Rohrscheldt Patents

(57) ABSTRACT

A method for extracting aromatic substances from solid plant based aroma bearers in a brew liquid, in particular in beer, having the steps: receiving a supply of aroma bearers in a process container, and flowing the process container through with a brew liquid, wherein the brew liquid flows through the process container with the supply of aroma bearers in at least one turbulent vortex flow.

6 Claims, 3 Drawing Sheets

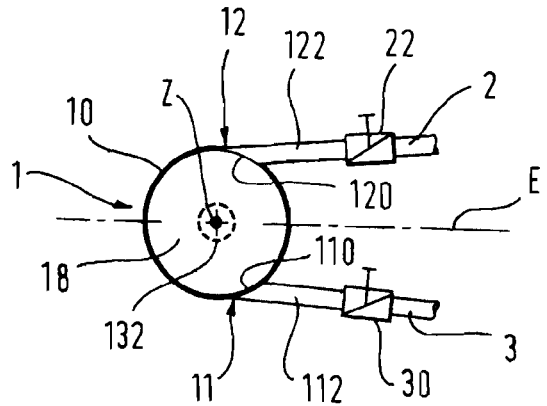
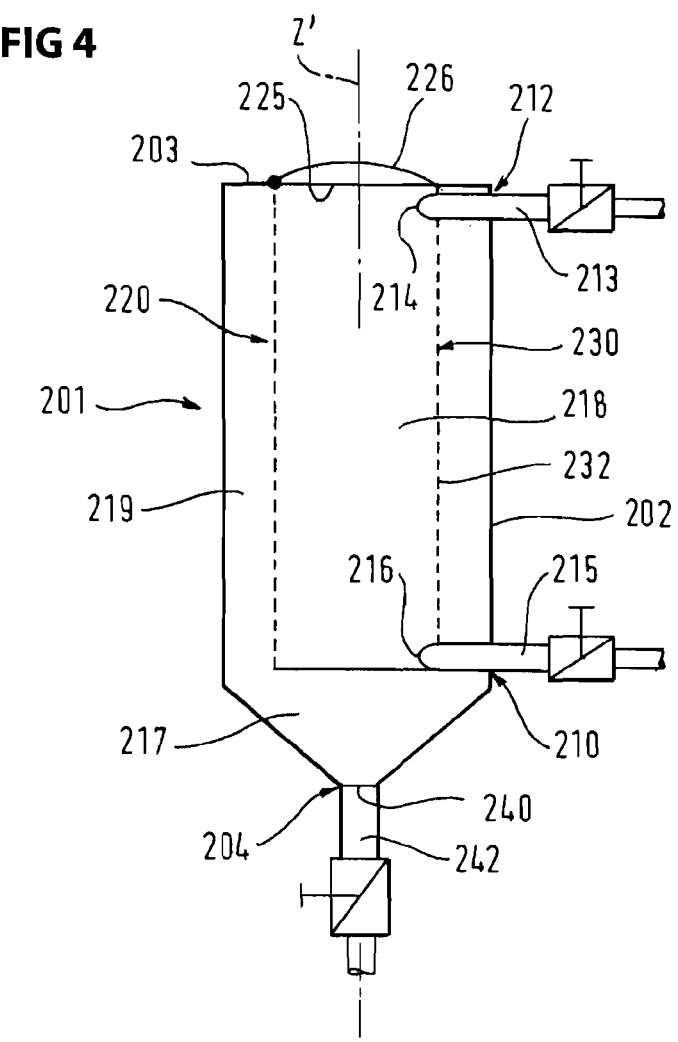

METHOD FOR EXTRACTING AROMATIC SUBSTANCES FROM SOLID PLANT AROMATIC SUBSTANCE BEARERS IN A BREW LIQUID

RELATED APPLICATIONS

This Application claims priority from German Patent Application DE 10 2012 110 830.7 filed on Nov. 12, 2012, which is incorporated in its entirety by this reference.

FIELD OF THE INVENTION

The present invention relates to a method and a device for extracting aromatic substances from solid aroma bearers in a brew liquid, in particular for extracting aromatic substances from solid hops products like for example hops pellets made from ground and pressed hops in beer or intermediary beer products during beer production.

BACKGROUND OF THE INVENTION

When brewing beverages, in particular when brewing beer, a differentiation is made between the fermentation process and the storage process. After fermentation, the yeast added in the fermentation process has no more activity left and the brewed liquid is substantially separated from the yeast. During the subsequent storage of the cooled down brew liquid, undesirable aromas are reduced and further clearing of the brewing liquid is performed, for example of the so-called young beer. In this phase, additional aromatic substances can be added to the brew liquid since no aromatic substances are bonded by the yeast anymore. When brewing beer, pressed hops pellets are typically introduced into a storage tank for the brew liquid, wherein the hops aromas are transported from the solid matrix of the hops pellets through diffusion and a negative concentration gradient into the brew liquid, thus into the young beer. This extraction of aromatic substances is also designated as dry hopping. This method, however, has disadvantages since resins exiting from the hops pellets quickly form deposit in the storage tank so that materials transition is degraded.

Another method to introduce aroma into the beer is suspending sacks or baskets that are filled with hops pellets in the storage tank. This method, however, becomes more and more inefficient with increasing tank size since on the one hand side, the ratio of surface to volume degrades during scale up and, on the other hand side, the path for the diffusion of the aromatic substances out of the solid matrix becomes longer and longer. Thus, this method is unsuitable for industrial applications.

It has therefore already been proposed to dissolve hops pellets in a separate container through which the brew liquid is pumped from the tank into a cycle and to transport the aromatic substances from the hops pellets into the beer. EP 2 500 408 A1 describes an arrangement and a method for introducing hops into a tank, wherein the hops is supplied from a hops storage container into a mixer which includes an inlet and an outlet for beer stored in a tank. The beer from the tank is pumped through the mixer and the supplied hops is mechanically milled in the mixer by a mixing tool. Mechanically milling the pellets provides excellent substance transmission of the hops aromas into the beer, the fine milled solids of the hops matrix, however, can only be precipitated with great difficulty in the subsequent filtration step due to the small particle sizes. This applies to sedimentation or filtration.

Other devices and methods are known in which the hops pellets are stored in a container and the container is then flowed through by the brew liquid. Thus, however, it cannot be excluded that swollen hops fragments clog the outlet or also that large hops fragments are carried out which then quickly sediment in the storage tank and lead to the low quality substance transfer as recited supra.

BRIEF SUMMARY OF THE INVENTION

Thus it is the object of the present invention to provide a method and a device for extracting aromatic substances from solid plant based aroma bearers which facilitates a substance transfer of the aromatic substances from the solid plant based aroma bearers into the brew liquid without additional mechanically driven devices so that reliable operations are provided.

The object is achieved through a method for extracting aromatic substances from solid plant based aroma bearers in a brew liquid, in particular beer, comprising the steps: receiving a supply of aroma bearers in a process container, and flowing the process container through with a brew liquid, wherein the brew liquid flows through the process container with the supply of aroma bearers in at least one turbulent vortex flow.

In this method according to the invention for extracting aromatic substances from solid plant based aroma bearers, a supply of the aroma bearers is included in a process container and is flushed through by a brew liquid, wherein the brew liquid including the supply of aroma bearers flows through the process container in at least one turbulent vortex flow.

This turbulent vortex flow provides that, on the one hand side, an intense mixing of the aroma bearers is provided with the brew liquid which leads to a very effective extraction of the aroma substances from the aroma bearers and, on the other hand side, prevents a plug formation of the aroma bearers in particular when the aroma bearers have swelled up. In a particularly advantageous manner, the method is usable when the solid plant aroma bearers are formed by pressed pellets, for example by hops pellets, which are induced to swell by the brewing liquid. In this swelling phase of the pellets, the turbulent vortex flow prevents agglomeration and thus plug formation so that the pellets are effectively dissolved by the brewing liquid.

The brewing liquid advantageously flows through the process container with the supply of the aroma bearers in two opposite flow directions. This counter flow principle provides improved mixing of the aroma bearers with the brew liquid, in particular when the aroma bearers float up in the initial stage of the process when the brew liquid is introduced into the supply of aroma bearers and the liquid level rises.

Thus, it is particularly advantageous when the vortex directions of the opposite brew liquid flows are also oriented against one another. This introduction of the brew liquid into the supply of aroma bearers have the effect that one brew liquid flow is oriented clockwise and the other is oriented counter clockwise so that the two counter rotating and axially opposed brew liquid flows screw into one another thus providing an optimum mixing of the brew liquid with the aroma bearers.

The device based object of the invention is also implemented through a device with the features of patent claim 4.

This device for extracting aromatic substances from solid plant based aroma bearers in a brew liquid includes a process container which includes a tubular receiving cavity for the aroma bearers which is provided with a closeable fill in opening.

The process container includes at least one inlet and at least one outlet for the brew liquid, wherein a sieve device is provided between the receiving cavity and the outlet. The at least one inlet for the brew liquid leads into the receiving cavity in a tangential direction or with a tangential directional component. This tangential arrangement of the inlet for the brew liquid has the effect that the brew liquid is imparted a spin when introduced into the process container and in particular into the receiving cavity for the aroma bearers which becomes a vortex flow together with the axial flow forming in the process container. As stated supra, this vortex flow provides a particularly effective mixing of the solid plant aroma bearers with the brew liquid.

Preferably, the at least one inlet enters the tubular receiving cavity at an angle relative to its longitudinal axis. This inclination of the inlet at an angle to the longitudinal axis has the effect that the brew liquid flow forming in the process container and in particular in the receiving cavity is provided with an axial component in addition to the rotation component caused by the tangential inlet which further improves mixing.

In a particularly advantageous embodiment, a first inlet in the lower portion of the receiving cavity leads into the receiving cavity essentially in tangential direction and a second inlet leads into the upper portion of the receiving cavity essentially in tangential direction. This way, the brew liquid is introduced into the receiving cavity at two axially offset locations. This facilitates that, especially when flooding the receiving cavity with brew liquid, a formation of a plug from aroma bearers that float up with the rising liquid level is effectively prevented.

Thus, it is particularly advantageous when the first lower inlet leads into the receiving cavity at a slant angle from below and when the second upper inlet leads into the receiving cavity at a slant angle from above. Thus, the two introduced brew liquid flows are imparted with an opposite axial component so that a mixing of the aroma bearers that float up with a rising liquid level is also provided in axial direction in a particularly advantageous manner.

An advantageous improvement of the device according to the invention is that the first lower inlet and the second upper inlet lead into the receiving cavity on opposite sides with respect to a center plane including a longitudinal axis of the tubular receiving cavity so that the brew liquid flowing in through the first lower inlet and the brew liquid flowing in through the second upper inlet flow into the receiving cavity in opposite rotation directions. This arrangement of the two inlets provides the formation of two brew liquid flows in the receiving cavity that twist into one another.

An advantageous embodiment of the device according to the invention is characterized in that the sieve device is formed by a tubular inner element with a sieve jacket wherein the receiving cavity for the aroma bearers is formed in the interior of the tubular inner element and wherein the outlet is in liquid connection with a space enveloping the sieve jacket. The brew liquid flow from the receiving cavity to the outlet is thus performed radially from the inside out through the sieve jacket which provides a large sieve surface and which reduces the risk of clogging the openings of the sieve jacket with particles of aroma bearers. This embodiment is particularly useful for very small arrangements in order to prevent a bridge formation of the pouring material, but also for very large arrangements to counter act the effect where a ratio of volume to surface is reduced during scale up since the volume increases with the third power but the surface only increases with the second power.

In an alternative solution in which the sieve device is also formed by a tubular inner element with a sieve jacket, the receiving cavity for the aroma a bearers is formed by a space enveloping the inner element and the outlet is in fluid connection with the inner cavity of the inner element. In this variant, the brew liquid flows from the receiving cavity for the aroma bearers towards the outlet in radial direction from an outside in. Thus, the risk that the openings of the sieve jacket clog with particles of the aroma bearers is already reduced because the particles of the aroma bearers are forced radially outward, thus away from the sieve jacket through the rotation flow forming in the receiving cavity and the centrifugal effect associated therewith.

It is also advantageous when the sieve jacket of the sieve device is configured so that only very small well extractable solid particles can pass.

With respect to easy cleaning, it is advantageous when the sieve jacket is configured as a spiral welded slot sieve.

BRIEF DESCRIPTION OF THE DRAWINGS

The invention is subsequently described in more detail with reference to the drawing figure, wherein:

FIG. 3 illustrates a horizontal sectional view of the process container of FIG. 2 along the line III-III, and FIG. 4 illustrates an alternative embodiment of a process container of the device according to the invention.

DETAILED DESCRIPTION OF THE INVENTION

Figure 1:
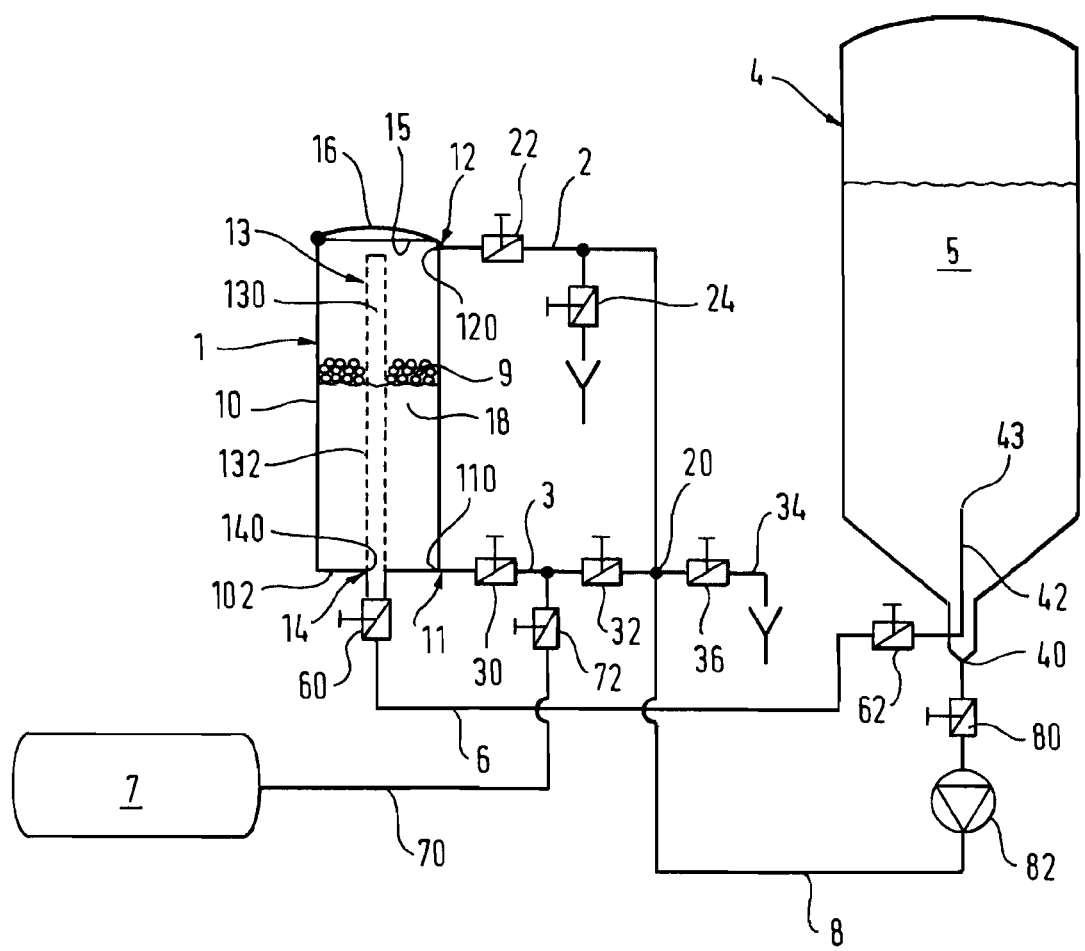
FIG. 1 illustrates a process arrangement with a device according to the invention for extracting aromatic substances form solid plant based aroma bearers or performing the method according to the invention in an embodiment of a beer production arrangement in a brewery.

FIG. 1 illustrates a process arrangement for performing the method according to the invention. A process container 1 is connected with a storage tank 4 through an upper inlet conduit 2 and a lower inlet conduit 3 in which storage tank a supply of a brew liquid 5 is stored. An outlet conduit 6 connects a lower end of the process container 1 with the storage tank 4. The process container 1 includes a lower inlet 11 with a lower inlet opening 110 and an upper inlet 12 with an upper inlet opening 120 and an outlet 14 with an outlet opening 140. The inlet openings 110, 120 are provided in a housing jacket 10 of the cylindrical process container 1 and the outlet opening 140 is arranged in a base wall 102 of the process container 1.

Additionally, an inert gas storage 7 is provided which is connected with an inert gas conduit 70 with the lower inlet conduit 3 of the process container 1. Shortly in front of the connection of the inert gas conduit 70 with the lower inlet conduit 3, a cutoff valve 72 is provided in the inert gas conduit 70, wherein the inert gas conduit 70 is blockable through the cutoff valve and the inert gas flow is regulatable.

Upstream and downstream of the outlet of the inert gas conduit 70 into the lower inlet conduit 3, a first lower inlet valve 30 and a second lower inlet valve 32 are provided in the inlet conduit 3. The first lower inlet valve 30 is arranged in the inlet conduit 3 between the outlet of the inert gas conduit 70 into the inlet conduit 3 and the lower inlet opening 110 of the process container 1. The second lower inlet valve 32 is provided between the inlet of the inert gas conduit 70 into the lower inlet conduit 3 and a branch off point 20 in which a common inlet conduit 8 originating from a lower outlet 40 of the storage container 4 branches into the lower inlet conduit 3 and the upper inlet conduit 2. An outlet conduit 34 originates from the branch off point 20, wherein the outlet conduit is blockable through a valve 36 and used for emptying the process container 1 through the lower inlet conduit 3.

The upper inlet conduit 2 is connected through an upper inlet valve 22 that is configured as a cutoff and/or regulation valve with the upper inlet opening 120 of the process container 1 and thus forms the upper inlet 12 of the process container 1. Also, the upper inlet conduit 2 is provided with an outlet valve 24 through which the upper inlet conduit 2 can be bled from air and emptied.

The common inlet conduit 8 originating from the storage container 4 is connected to the lower outlet 40 of the storage container 4 through a cutoff an7or control valve. Furthermore, a pump 82 is provided in the common inlet conduit 8 wherein the pump 82 can be used to introduce brew liquid 5 from the storage container 4 through the common inlet conduit 8, the lower inlet conduit 3 and the upper inlet conduit 2 into the process container 1.

The outlet conduit 6 is connected through a cutoff valve 60 with an outlet opening 140 of the process container 1. A sieve device 13 is provided in the interior of the process container 1, wherein the sieve device includes an inner outlet tube 130 including a sieve jacket 132 and is connected with the outlet opening 140. The outlet conduit 6 runs back to the storage tank 4 where it is connected through a cutoff valve 62 which connects the outlet conduit 6 with an existing riser tube 42 in the storage tank 4 so that the brew liquid returned through the outlet conduit 6 is conducted upward in the storage tank 4, thus away from the lower outlet 40 of the storage tank 4. A riser tube 6 of this type is typically provided in a storage tank 4 that is used as a fermentation tank of a brewing arrangement and forms an upper outlet 43 therein with its open upper end. This upper outlet 4 is used in the device according to the invention as an inlet for the brew liquid returned from the process container 1 into the storage tank 4. This return of the brew liquid through the upper outlet 43 of the storage tank 4 causes an efficient mixing of the brew liquid 5 stored in the storage tank 4 and prevents that the brew liquid returned from the process container 1 is returned directly through the lower outlet 40 of the storage tank 4 back into the process container 1. Adding inert gas into the conduit 6 through a path that is not illustrated helps to further improve the distribution of the hops suspension in the storage tank 4. This is advantageous in particular for large and tall storage tanks.

The process container 1, whose configuration is described infra is provided with a pivotable lid 16 at its top side, wherein the pivotable lid closes an upper fill in opening 15 tightly. Solid plant based aroma bearers 9, for example hops pellets or hops umbels, can be filled through this fill in opening 15 into an annular receiving cavity 18 that is formed in the interior of the process container 1 and that envelops the outlet tube 130.

Figure 2:
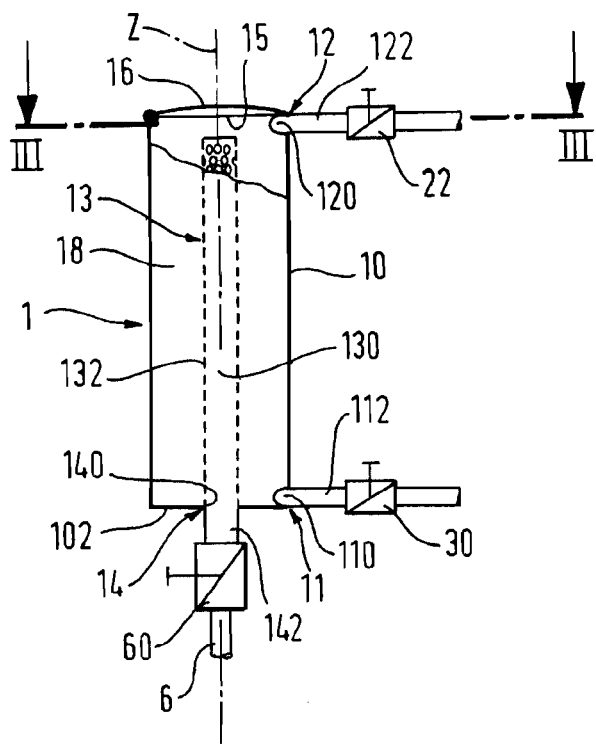
FIG. 2 illustrates the embodiment of a process container according to the invention of a device for extracting aromatic substances from solid plant based aroma bearers illustrated in FIG. 1 in detail.

FIG. 2 illustrates the process container 1 of the device according to the invention in a partially cut lateral view.

The process container 1 is provided with a cylindrical outside wall 100 which radially defines the annular tube shaped receiving cavity 18 in outward direction. In radial inward direction, the annular receiving cavity 18 is defined by the sieve jacket 132 of the centrally arranged inner outlet tube 130. The inner outlet tube 130 and the cylindrical outer wall 100 of the process container 1 are therefore arranged coaxial to one another and to the longitudinal axis z of the process container 1. The process container 1 is defined by a base wall 102 at its axial lower, end which base wall includes the central outlet opening 140. At the upper end, the process container 1 is provided with the upper fill in opening 15 which is closeable gas and liquid tight through the pivotable cover 16.

The upper inlet 12 includes an upper inlet tube 122 connected with the upper inlet valve 22, wherein the upper inlet tube 122 is connected with an edge of the upper inlet opening 120. The upper inlet tube 122 extends in a plane which is orthogonal to the longitudinal axis Z and leads tangentially or approximately tangentially into the receiving cavity 18 formed in the process container 1. The liquid introduced through the upper inlet 12 into the receiving cavity 18 of the process container 1 thus flows counter clockwise into the receiving cavity 18 in the illustration of FIG. 3.

The lower inlet 11 includes a lower inlet valve 112 which extends from the first lower inlet valve 30 to the process container 1 and is connected therein with the edge of the lower inlet opening 110. Also the lower inlet tube 112 extends in a plane which extends orthogonal to the longitudinal axis Z and the lower inlet tube 112 also leads in a tangential direction into the receiving cavity 18 of the process container 1 as illustrated in FIG. 3. However, the inlet opening of the lower inlet 11 is on an opposite side of the center plane E including the longitudinal axis Z of the process container 1 and of the tubular receiving cavity 18 with respect to the inlet opening of the upper inlet 12. This arrangement of the lower inlet 11 has the effect that liquid introduced through the lower inlet into the process container 1, and thus into the receiving cavity 18, flows clockwise according to the illustration of FIG. 3.

The outlet 14 of the process container 1 is provided with an outer outlet tube 142 which is connected with an edge of the outlet opening 140 and which extends from there to the outlet valve 60. The outer outlet tube 142 extends coaxially to the axis Z and extends the lower outlet tube 130 in downward direction.

Figure 2A:
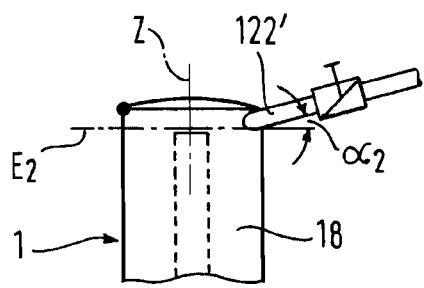
FIG. 2a illustrates a variant of the process container of FIG. 2 with an inclined upper inlet.
Figure 2B:
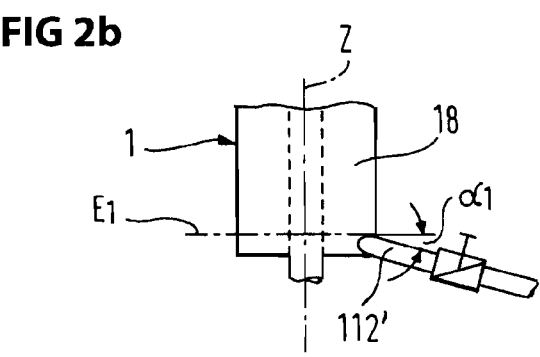
FIG. 2b illustrates a variant of the process container of FIG. 2 with an inclined lower inlet.

FIGS. 2a and FIG. 2b illustrate a variant of the process container illustrated in FIG. 2. The lower inlet tube 112' leads in this embodiment inclined at an angle $\alpha_1$ to a plane $E_1$ oriented orthogonal to the longitudinal axis Z at a slant angle from below into the receiving cavity 18 and thus into the process container 1 (FIG. 2b). The upper inlet tube 122' leads inclined at an angle $\alpha_2$ to a plane $E_2$ oriented orthogonal to the longitudinal axis Z at a slant angle from above into the receiving cavity 18 and thus into the process container 1 (FIG. 2a). The inclination angles $\alpha_1$ and $\alpha_2$ are advantageously in a range of 15° to 30°.

Also in this variant of FIGS. 2a and 2b, the upper inlet tube 122' and the lower inlet tube 112' lead into the process container 1 in a tangential direction or with a tangential directional component analogous to the illustration in FIG. 3.

A modified embodiment of the process container illustrated in FIG. 2 is illustrated in FIG. 4. The process container 201 illustrated therein is configured in an inverse manner relative to the embodiment of FIG. 2, this means that the process container 201 includes a centrally arranged receiving cavity 218 for the solid plant based aroma bearers, wherein the receiving cavity 218 is formed by a receiving tube 230 which is defined at its outer circumference by a sieve jacket 232 and which receiving tube 230 is arranged in an interior of the process container 201 defined in radial direction by a cylindrical housing jacket 202 and the receiving tube 230 is arranged coaxial to the housing jacket and to the longitudinal axis Z'.

The inner receiving tube 230 forming a sieve device 220 is thus enveloped by an annular cavity 219 which leads to a lower collection funnel 217 which forms the base of the process container 201 and which includes an outlet opening 240 at its lower tapered end, wherein the outlet opening forms the outlet 204 of the process container 201 together with the outer outlet tube 242.

The upper face wall of the process container 201 is provided with a center fill in opening 225 whose edge is connected with the sieve jacket 232 and which is closeable gas and liquid tight through a cover 226 and thus forms an access to the central receiving cavity 218 for the plant based aroma bearers.

The upper inlet 212 and also the lower inlet 210 are provided with an upper inlet tube 213 or a lower inlet tube 215 as illustrated in the embodiment of FIG. 2, wherein both inlet tubes lead into the receiving cavity 218 of the process container 201. Thus, the upper inlet tube 213 penetrates the cylindrical outer jacket 202 of the process container 201 and is connected with the edge of an upper inlet opening 214 in the sieve jacket 232 of the receiving tube 230. In analogy thereto, the lower inlet tube 215 of the lower inlet 210 also penetrates the outer jacket 202 of the process container 201 and is connected with the edge of a lower inlet opening 216 in the sieve jacket 232 of the receiving tube 230.

Also in the alternative embodiment illustrated in FIG. 4, the inlet tubes 213 and 215 lead into the receiving cavity 218 on different sides of the center plane E in a tangential manner or almost tangential thereto analogous to the embodiment illustrated in FIG. 3, so that, also in this variant, two counter rotating flows are formed in the receiving cavity 218.

Furthermore, an embodiment analogous to FIGS. 2a and 2b can also be provided for the variant illustrated in FIG. 4, this means that also the inlet tubes 213 or 215 can be inclined in a way as illustrated and described in conjunction with the embodiments in FIGS. 2a and 2b.

Though cylindrical cross sections for the process container 1 and the inner outlet tube 130 or the inner receiving tube 230 have been described for the recited embodiments, the invention is not limited to circular cross sections. By the same token, these cross sections can also be elliptical or also polygonal.

The function of the device according to the invention and of the method according to the invention is subsequently described in more detail with reference to FIG. 1.

Before the brewing liquid is introduced into the process container 1, inert gas is introduced from the inert gas container 7 through the inert gas conduit 70 and the lower inlet conduit 3 into the process container 1. This inert gas thus displaces the air from the process container 1 which flows out through the upper inlet conduit 2 and the open drain valve 24 arranged thereon. This way, the process container 1 and also the lower inlet conduit 3 and the upper inlet conduit 2 are flushed with inert gas, for example with carbon dioxide, until air including oxygen has been purged from the system. This purging of the oxygen content from the conduit system is essential since the brewing liquid is otherwise impaired by reacting with oxygen for example when producing beer.

When the air including oxygen has been purged from the system, the process container 1 is fed through the lower inlet conduit 3 and the open valves 30, 32 and the common inlet conduit 8 with the brew liquid 5 pumped out of the storage tank 4, wherein the cutoff valve 60 of the drain conduit 6 is closed. For this filling process, the outlet valve 24 in the upper inlet conduit is open so that gas can escape from the system.

When the process container 1 has been filled with the brewing liquid 5, the drain valve 4 in the upper inlet conduit 2 and also the upper inlet valve 22 in the upper inlet conduit 2 are closed and the cutoff valve 60 is opened. The brewing liquid flowing in through the tangential lower inlet 11 under the pressure build up by the pump 82 is forced to rotate in the interior of the process container 1 and thus forms a vortex flow which mixes the brew liquid 5A received in the receiving cavity 18 of the process container with the aroma bearers 9 initially floating on the level of the brew liquid 5A.

The aroma bearers 9 are solids which are forced into motion and kept in motion by the rotating flow so that the aroma bearers accumulate at the outer wall of the receiving cavity 18, so that the sieve openings in the central inner outlet tube 130 of the process container 1 are not closed and blocked by the solid materials, so that an unrestricted outflow of the brew liquid through the inner outlet tube 130 and the outer outlet tube 142 into the outlet conduit 6 is provided.

Under a high load of the process container 1 with plant based aroma bearers 9, the upper inlet valve 22 in the upper inlet conduit 2 is opened additionally and the brew liquid supplied from the storage tank 4 is introduced in addition to the described lower introduction also through the upper inlet 12 into the process container 1. This generates a second brew liquid flow oriented from the top down in the process container 1 that is opposite to the first brew liquid flow oriented from the bottom up, wherein the second brew liquid flow has a spin that is contrary to the spin of the first brew liquid flow due to the described configuration of the upper inlet. The two brew liquid flows screw into one another and thus swirl the plant based aroma bearers, thus the solid particles, particularly intensely in the brew liquid supply 5A in the receiving cavity 18, so that a formation of a floating cover with plant based aroma bearers 9, which occurs when slowly filling the process container and which is described in an exemplary manner in FIG. 1, is prevented during operations. These counter flowing brew liquid flows that screw into one another in opposing directions generate a highly turbulent flow zone in their impact area which provides particularly good mixing of the solids provided as the plant based aroma bearers 9 with the brew liquid supply 5A and in which dissolving the solids in the brew liquid 5A is facilitated an accelerated.

The sieve jacket 132, 232 of the sieve device 13, 220 is configured so that only very small easily extractable solid particles can pass. The sieve shape of the sieve jacket 132, 232 is not limited to a hole sieve. The sieve jacket 132, 232 can also have any suitable configuration of a sieve in particular the sieve jacket 132, 232 can also be configured as a spiral welded slot sieve. This embodiment is advantageously cleanable in a simple manner.

The invention is not limited to the embodiments recited supra which are only used for a general explanation of the core idea of the invention. Within the scope of the invention, the device according the invention can also be provided in other embodiments than described. Thus, the device can in particular have features combined from individual features of the respective claims.

Reference numerals in the claims, the description and the drawings are only used for better understanding of the invention and do not limit the scope of the invention.

REFERENCE NUMERALS AND DESIGNATIONS

1 Process container
2 Upper inlet conduit
3 Lower inlet conduit
4 Storage tank
5, 5A Brew liquid
6 Outlet conduit
7 Inert gas storage
8 Common inlet conduit
9 Aroma bearer
10 Housing jacket
11 Lower inlet
12 Upper inlet
13 Sieve device
14 Outlet
15 Fill in opening
16 Lid
18 Receiving cavity
20 Branch off point
22 Upper inlet valve
24 Outlet valve
30 First lower inlet valve
32 Second lower inlet valve
34 Outlet conduit
36 Valve
40 Lower outlet of the storage tank
42 Riser tube
43 Upper outlet of the storage tank
60 Cutoff valve on outlet of the process container
62 Cutoff valve on riser tube of the storage container
70 Inert gas conduit
72 Inert gas valve
80 Cutoff valve on lower outlet of the storage tank
82 Pump
102 Base wall
112, 112' Lower inlet tube
122, 122' Upper inlet tube
130 Inner outlet tube
132 Sieve jacket
140 Outlet opening
142 Outer outlet tube
201 Process container
202 Housing jacket
203 Upper face wall of the process container
204 Outlet
210 Lower inlet
212 Upper inlet
213 Upper inlet tube
214 Upper inlet opening
215 Lower inlet tubes
216 Lower inlet opening
217 Collection funnel
218 Receiving cavity
219 Annular cavity
220 Sieve device
225 Fill in opening
226 Lid
230 Receiving tube
232 Sieve jacket
240 Outlet opening
242 Outer outlet tube
Z, Z' Longitudinal axis
E Center plane
$E_1, E_2$ Horizontal planes
$\alpha_1, \alpha_2$ Inclination Angles

What is claimed is:

1. A device for extracting aromatic substances from solid plant based aroma bearers by a brew liquid, the device comprising:
a process container including:
a tubular receiving cavity for the solid plant based aroma bearers;
a closeable fill in opening for the solid plant based aroma bearers;
a first inlet for the brew liquid;
a second net for the brew liquid; and
at least one outlet for the brew liquid,
wherein a sieve device is provided between the tubular receiving cavity and the outlet,
wherein the first inlet for the brew liquid leads into the tubular receiving cavity in a lower portion of the tubular receiving cavity essentially in a tangential direction or with a tangential direction component, and
wherein the second inlet for the brew liquid leads into the tubular receiving cavity in an upper portion of the tubular receiving cavity essentially in a tangential direction or with a tangential direction component,
wherein the first, lower inlet for the brew liquid and the second, upper inlet for the brew liquid lead into the tubular receiving cavity on opposite sides of a center plane including the longitudinal axis of the tubular receiving cavity so that brew liquid flowing in through the first, lower inlet for the brew liquid and brew liquid flowing in through the second, upper inlet for the brew liquid flow into the receiving cavity in opposite directions of rotation about the longitudinal axis.

2. A device for extracting aromatic substances from solid plant based aroma bearers by a brew liquid, the device comprising:
a process container including
a tubular receiving cavity for the solid plant based aroma bearers,
a closeable fill in opening for the solid plant based aroma bearers,
at least one inlet for the brew liquid, and
at least one cutlet for the brew liquid,
wherein a sieve device is provided between the tubular receiving cavity and the outlet,
wherein the at least one inlet for the brew liquid leads into the tubular receiving cavity in a tangential direction or with a tangential directional component,
wherein the sieve device is formed by a tubular inner element with a sieve jacket,
wherein the tubular receiving cavity for the aroma bearers is formed in an interior of the tubular inner element, and
wherein the outlet is in fluid connection with a space enveloping the sieve jacket.

3. A device for extracting aromatic substances from solid plant based aroma bearers by a brew liquid, the device comprising:
a process container including
a tubular receiving cavity for the solid plant based aroma bearers, a closeable fill in opening for the solid plant based aroma bearers,
at least one inlet for the brew liquid, and
at least one outlet for the brew liquid,
wherein a sieve device is provided between the tubular receiving cavity and the outlet,
wherein the at least one inlet for the brew liquid leads into the tubular receiving cavity in a tangential direction or with a tangential directional component,
wherein the at least one inlet for the brew liquid includes a first inlet for the brew liquid and a second inlet for the brew liquid,
wherein the first inlet for the brew liquid leads into the tubular receiving cavity in a lower portion of the tubular receiving cavity essentially in a tangential direction or with a tangential direction component,
wherein the second inlet for the brew liquid leads into the tubular receiving cavity essentially at an upper end of the tubular receiving cavity essentially in a tangential direction or with a tangential direction component, and
wherein the first inlet for the brew liquid and the second inlet for the brew liquid introduce the brew liquid from an identical,
wherein the sieve device is formed by a tubular inner element with a sieve jacket,
wherein the tubular receiving cavity for the aroma bearers is formed by a space enveloping the tubular inner element, and
wherein the outlet is in fluid connection with the inner cavity of the tubular inner element.

4. The device according to claim 1, wherein the aroma bearers are provided as pressed elements and the brew liquid is beer.

5. The device according to claim 2, wherein the aroma bearers are provided as pressed elements and the brew liquid is beer.

6. The device according to claim 3, wherein the aroma bearers are provided as pressed elements and the brew liquid is beer.

\* \* \* \* \*